United States Patent [19]

Komarek

[11] 4,389,178

[45] Jun. 21, 1983

[54] RAM-TYPE FEEDER FOR BRIQUETTING PRESS

[75] Inventor: Karl R. Komarek, Chicago, Ill.

[73] Assignee: K. R. Komarek, Inc., Elk Grove Village, Ill.

[21] Appl. No.: 288,799

[22] Filed: Jul. 31, 1981

[51] Int. Cl.³ .......................... B29C 3/02; B29C 3/04

[52] U.S. Cl. .................................... 425/237; 425/456

[58] Field of Search ............... 425/237, 456, 346, 406, 425/412

[56] References Cited

U.S. PATENT DOCUMENTS

| | | | |
|---|---|---|---|
| 379,068 | 3/1888 | Heller et al. | 425/237 X |
| 1,085,716 | 2/1914 | Wert | 425/456 |
| 1,164,726 | 12/1915 | Kramer | 425/456 |
| 1,183,896 | 5/1916 | Miller | 425/456 |
| 1,879,293 | 9/1932 | Jones | 425/237 |
| 2,076,284 | 4/1937 | Vierow | 425/456 X |
| 2,156,895 | 5/1939 | Godat . | |
| 2,310,748 | 2/1943 | Pearson | 425/237 X |
| 2,485,523 | 10/1949 | Ashbauga . | |
| 2,595,865 | 5/1952 | Lunsford | 425/237 |
| 2,621,364 | 12/1952 | Stillman . | |
| 2,736,923 | 3/1956 | Schieser et al. . | |
| 2,916,792 | 12/1959 | Crook et al. . | |
| 2,977,631 | 4/1961 | Komarek et al. . | |
| 3,122,784 | 3/1964 | Jolliffe . | |
| 3,124,837 | 3/1964 | Jackson et al. . | |
| 3,174,846 | 3/1965 | Brisse et al. . | |
| 3,269,611 | 8/1966 | Komarek . | |
| 3,328,843 | 7/1967 | Murphy et al. . | |
| 3,359,597 | 12/1967 | Bainton . | |
| 3,366,717 | 1/1968 | Rohaus . | |
| 3,450,529 | 6/1969 | MacDonald . | |
| 3,579,723 | 5/1971 | Brown . | |
| 3,611,483 | 10/1971 | Amsden et al. . | |
| 3,674,397 | 7/1972 | Harris . | |
| 3,728,056 | 4/1973 | Theysohn . | |
| 3,734,659 | 5/1973 | Harris . | |
| 3,824,054 | 7/1974 | Harris | 425/237 X |
| 4,023,466 | 5/1977 | Strassheimer . | |
| 4,141,678 | 2/1979 | Jex . | |

FOREIGN PATENT DOCUMENTS

| | | | |
|---|---|---|---|
| 1121453 | 8/1956 | France | 425/237 |

*Primary Examiner*—Philip E. Anderson
*Attorney, Agent, or Firm*—Finnegan, Henderson, Farabow, Garrett & Dunner

[57] ABSTRACT

A feeder for a briquetting press comprising a funnel for containing and directing particulate material toward the nip of a pair of cooperating rolls, an elongated ram axially disposed in the funnel with one end extending through the outlet of the funnel, and a power-driven drive shaft disposed normal to the ram and connected to the ram so that rotation of the drive shaft causes axial reciprocation of the ram.

8 Claims, 6 Drawing Figures

42
52
66
68
72
74
76
78
70
64
5
44
38
50
86
84
80
82
48
40
46
36
41

RAM-TYPE FEEDER FOR BRIQUETTING PRESS

BACKGROUND OF THE INVENTION

1. Field of the Invention

This invention relates to briquetting presses. More particularly, this invention is directed to a ram-feeder for briquetting presses.

2. Description of the Prior Art

Briquetting presses for compacting paticulate material in complementary cavities disposed about the peripheries of a pair of cooperating rolls have been in use for many years. As new applications for such briquetting presses develop, the structure and operation of the presses have to be modified.

The basic elements of briquetting presses are a pair of cooperating rolls, means for feeding particulate material into the nip of the rolls, means for rotating the rolls and means for biasing the rolls together. Each new application of a briquetting press requires variation in the structure or operation of these elements. While determination of suitable roll geometry is of primary concern, providing means for feeding particulate material into the nip of the rolls is a significant design concern. For each application, the feeder must meter the proper mass of paticulate material into each pair of complementary cavities on the peripheries of rapidly rotating rolls.

In early presses which were used primarily for forming or shaping materials, the problem of feeding the material was not severe; simple gravity-type feeders were generally adequate. For each tool geometry, however, there is a maximum increase in density which can be imposed on the material being formed between the rolls.

As the requirement for briquettes of greater density arose, the density-increasing effect of the rolls was supplemented by a screw or auger-type feeder which tended to increase the material density as it was fed into the nip of the rolls. The common use of screw-type feeders in briquetting presses today attests to their success for certain applications.

There have developed, however, many new applications for briquetting presses where screw-type feeders have proved impractical or a source of constant maintenance. The briquetting of high temperature or abrasive materials has presented particular problems. These materials have caused severe wear of screw-type feeders. Even though screw-type feeders have been made of expensive, exotic metals which resist the effects of high temperature and abrasive materials, frequent maintenance and replacement of scrrew feeders remain a problem. These problems with screw feeders have placed limits on the effective increase of density which may be provided by screw feeders when used to briquette high temperature or abrasive materials.

The present invention overcomes the problem by providing a feeder which greatly reduces the abrasive wear caused by the sliding or relative motion between the feeder and the particulate material being briquetted.

In particular, this invention is directed to an axially reciprocating ram feeder which pre-compresses particulate material into the nip of the rolls. In addition to reducing wear-causing abrasion, by varying the rate of reciprocation or length of stroke of the ram depending upon the rate of rotation of the rolls or roll geometry, the invention provides means for varying the amount of pre-compression obtained.

The ram feeder of the invention is also designed to be installed in the space occupied by screw-type feeders on existing briquetting machines. Thus, the advantages of the ram feeder may be obtained without having to invest in a new briquetting press.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the purpose of the invention, as embodied and broadly described herein, the feeder of this invention for a briquetting press in which particulate material is compressed in complementary cavities spaced about the peripheries of a pair of cooperating, rotating rolls comprises a funnel for directing the particulate materials to the nip of the rolls, elongated ram means coaxially disposed in the funnel for pre-compressing the particulate material into the nip of the rolls and power means for reciprocating the ram means in an axial stroke, the rate of reciprocation and the lengrh of stroke being selectively adjustable to optimize pre-compression of the particulate material into the nip of the rolls.

Preferably, the ram means comprises an elongated feeder shaft having opposed ends, one end being disposed in the funnel proximate its outlet for compressing the particulate material through the outlet and into the nip of the rolls during an axial stroke of the feeder shaft toward the outlet and preferably the power means comprises a drive shaft rotatably disposed normal to the axis of the feeder shaft and eccentrically rotatably secured to the feeder shaft proximate its other end for translating rotation of the drive shaft to axial reciprocation of the feeder shaft.

It is preferred that the feeder shaft be hollow and means be provided for circulating cooling liquid within the feeder shaft.

It is also preferred that a ram plate be removeably secured to the end of the feeder shaft for compressing particulate material into the nip of the rolls.

The accompanyng drawings, which are incorporated in and constitute a part of this specification, illustrate embodiments of the invention and, together with the description, serve to explain the principles of the invention.

DETAILED DESCRIPTION OF THE PREFERRED EMBODIMENT

Reference will now be made to the present preferred embodiments of the invention, examples of which are illustrated in the accompanying drawings.

Figure 1:
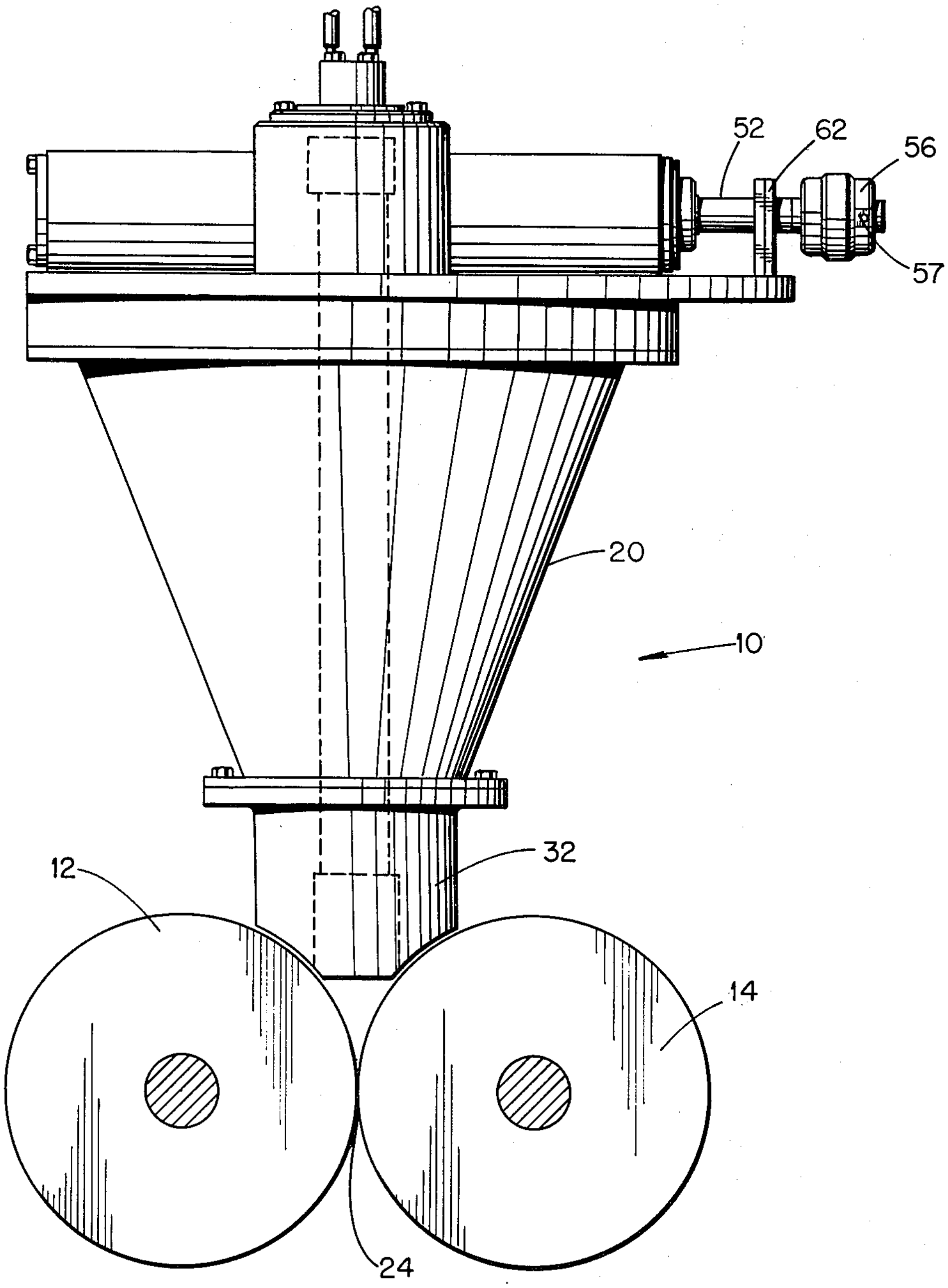
FIG. 1 is a partial schematic view of briquetting press incorporating the invention.
Figure 2:
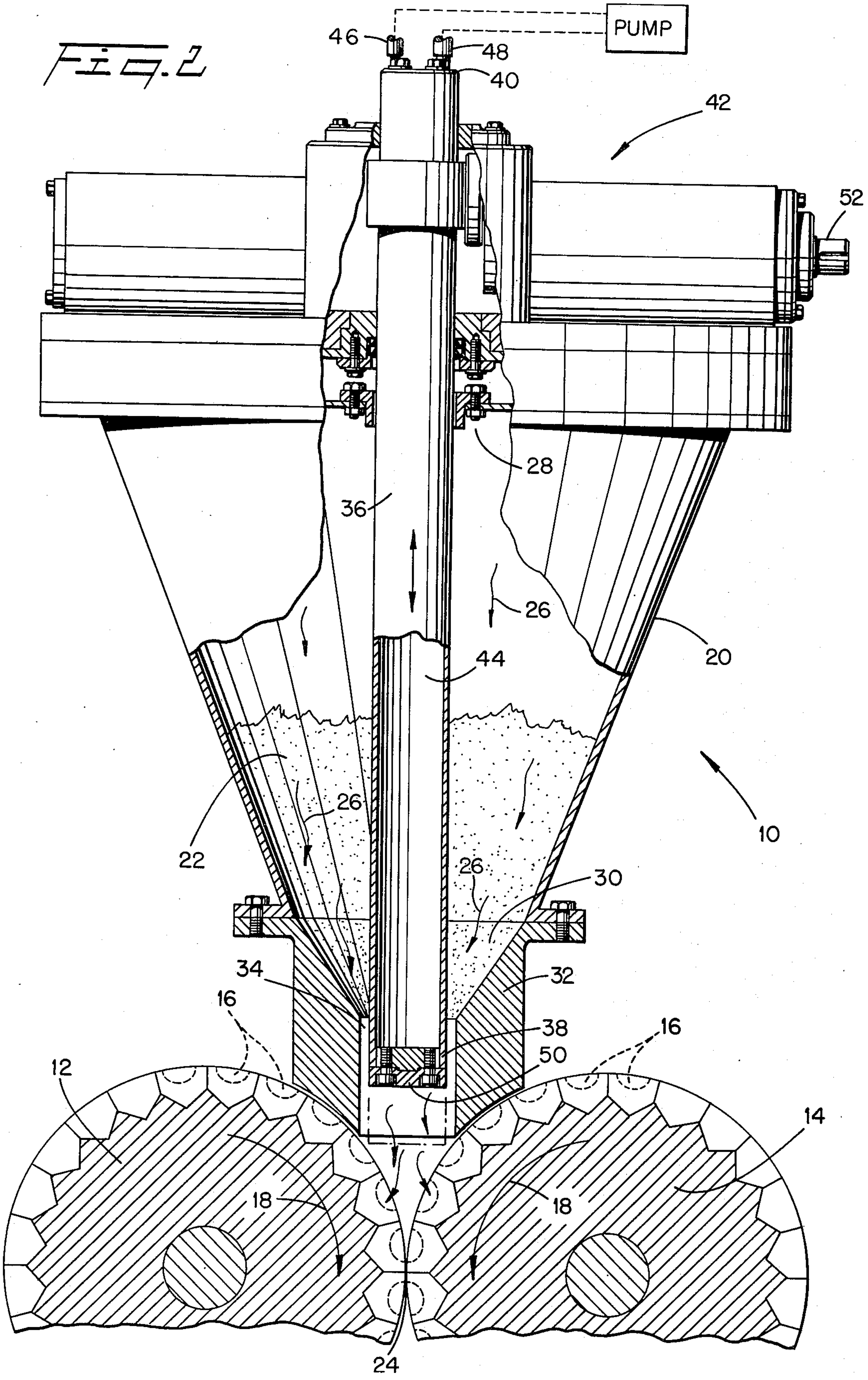
FIG. 2 is an enlarged, partially cut away view of a portion of the invention.

Referring to FIGS. 1 and 2, a briquetting press 10 includes a pair of cooperating rolls 12, 14 spaced about the peripheries of which are a plurality of complementary cavities 16. As the rolls 12, 14 rotate as indicated by the arrows 18 in FIG. 2, particulate material is compressed within the complementary cavities 16 forming briquettes.

In accordance with the invention, the feeder for the briquetting press comprises a funnel for directing the particulate material toward the nip of the rolls. As embodied and depicted in FIGS. 1 and 2, funnel 20 receives and contains particulate material 22 and directs it toward nip 24 of rolls 12, 14 as indicated by arrows 26 in FIG. 2.

Funnel 20 has inlet 28 and outlet 30 at opposed ends thereof. Preferably, member 32 is secured to outlet 30 of funnel 20 and defines conduit 34 for conducting particulate material 22 from outlet 30 to nip 24 of rolls 12, 14. Funnel or hopper 20 may be of any particular shape provided it contains and directs paticulate material through its outlet 30 towards nip 24 of rolls 12, 14.

In accordance with the invention, the feeder for the briquetting press also comprises ram means coaxially disposed in the funnel for pre-compressing the particulate material into the nip of the rolls.

Figure 3:
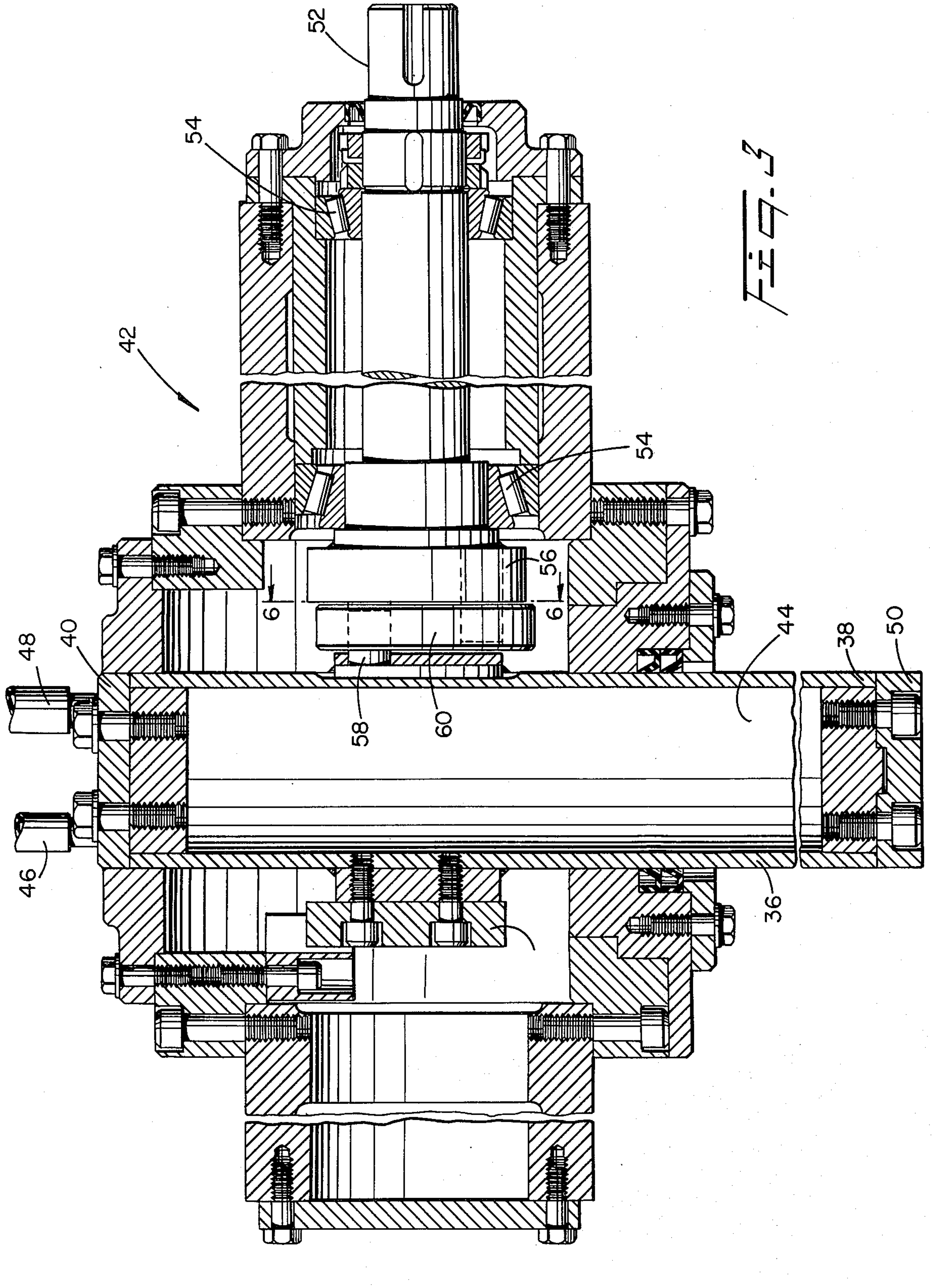
FIG. 3 is an enlarged cross-sectional view of a portion of the invention of FIG. 2.

In the embodiment depicted in FIGS. 2 and 3, the ram means comprises elongated feeder shaft 36 having opposed first and second ends 38, 40 respectively. Feeder shaft 36 is coaxially and slidably disposed in funnel 20 for axial movement thereof with first end 38 extending through outlet 30 for pre-compressing particulate material 22 into nip 24 of rolls 12, 14.

Preferably, feeder housing 42 is disposed across inlet 28 and secured to funnel 20. Feeder shaft or ram 36 is slidably mounted in feeder housing 42 proximate its second end 40. Key 41 is secured to feeder shaft 36 to prevent its rotation within housing 42.

It is also preferred that feeder shaft 36 include means for cooling. As seen in FIGS. 2 and 3, feeder shaft 36 has a hollow bore 44 enclosed at first and second ends 38, 40 thereof. Inlet nipple 46 and outlet nipple 48 provide fluid communication with bore 44 through second end 40. A cooling liquid such as water is conducted into bore 44 through inlet nipple 46. The larger diameter outlet nipple 48 conducts heated liquid and heat-generated steam from bore 44. A known cooling system including reservoir, pump and conduits may be used to conduct cooling liquid to and from bore 44.

In order to reduce abrasion and wear on first end 38 of the feeder shaft 36, it is preferred that ram plate 50 be removably secured to first end 38. Ram plate 50 may be made of an abrasion and heat resistant material and is removeable and replaceable. This reduces wear on feeder shaft 36 and permits easy repair of first end 38 of feeder shaft 36 once it is worn.

In accordance with the invention, the feeder for the briquetting press further comprises power means for reciprocating the ram means in an axial stroke, the rate of reciprocation and the length of stroke being selectively adjustible to optimize pre-compression of particulate material into the nip of the rolls.

In the embodiment depicted in FIGS. 1, 2 and 3, the power means comprises a power-driven drive shaft 52 having a longitudinal axis normal to the axis of feeder shaft 36 and means eccentrically connecting drive shaft 52 to feeder shaft 36 for translating rotation of drive shaft 52 to axial reciprocation of feeder shaft 36.

Preferably, drive shaft 52 is rotatably supported by bearings 54 in feeder housing 42. One end of drive shaft 52 is drivingly connected to motor 56 of a known kind which provides power to rotate drive shaft 52 at variable speeds.

Figure 6:
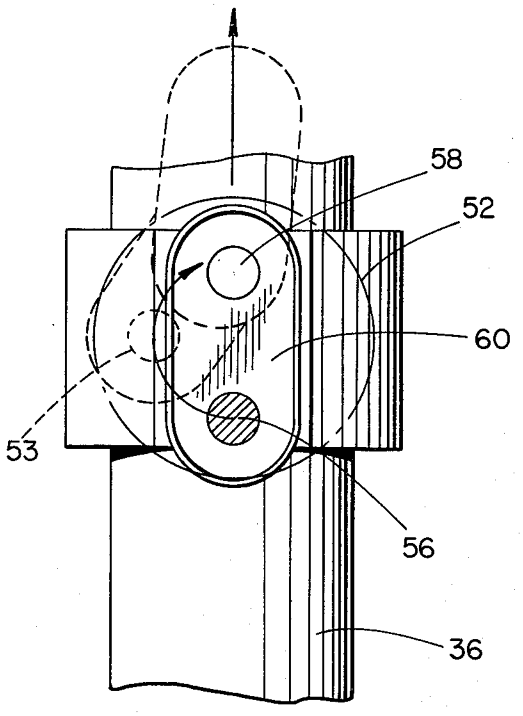
FIG. 6 is a cross-sectional view along line 6—6 of the embodiment depicted in FIG. 3.

As seen in FIGS. 3 and 6, the other end of drive shaft 52 has first crank pin 56 extending therefrom. First crank pin 56 is eccentrically mounted on the other end of drive shaft 52 so that rotation of drive shaft 52 provides movement of first crank pin 56 around the axis of the drive shaft. Second crank pin 58 is mounted on and extends from feeder shaft or ram 36 proximate second end 40 thereof. First and second crank pins 56, 58 are parallel to each other and are rotatably secured to and interconnected by crank arm 60. As seen in FIG. 6, rotation of drive shaft 52 is translated by first and second crank pins 56, 58 and crank arm 60 into axial reciprocation of feeder shaft 36.

Preferably, the embodiment depicted in FIGS. 1, 2 and 3 includes a slip clutch 62 of a known type which permits rotation of drive shaft 52 even when feeder shaft 36 is prevented from completing its axial stroke due to incompressibility of particulate material at outlet 30 or in conduit 34 or due to any other blockage.

Figure 4:
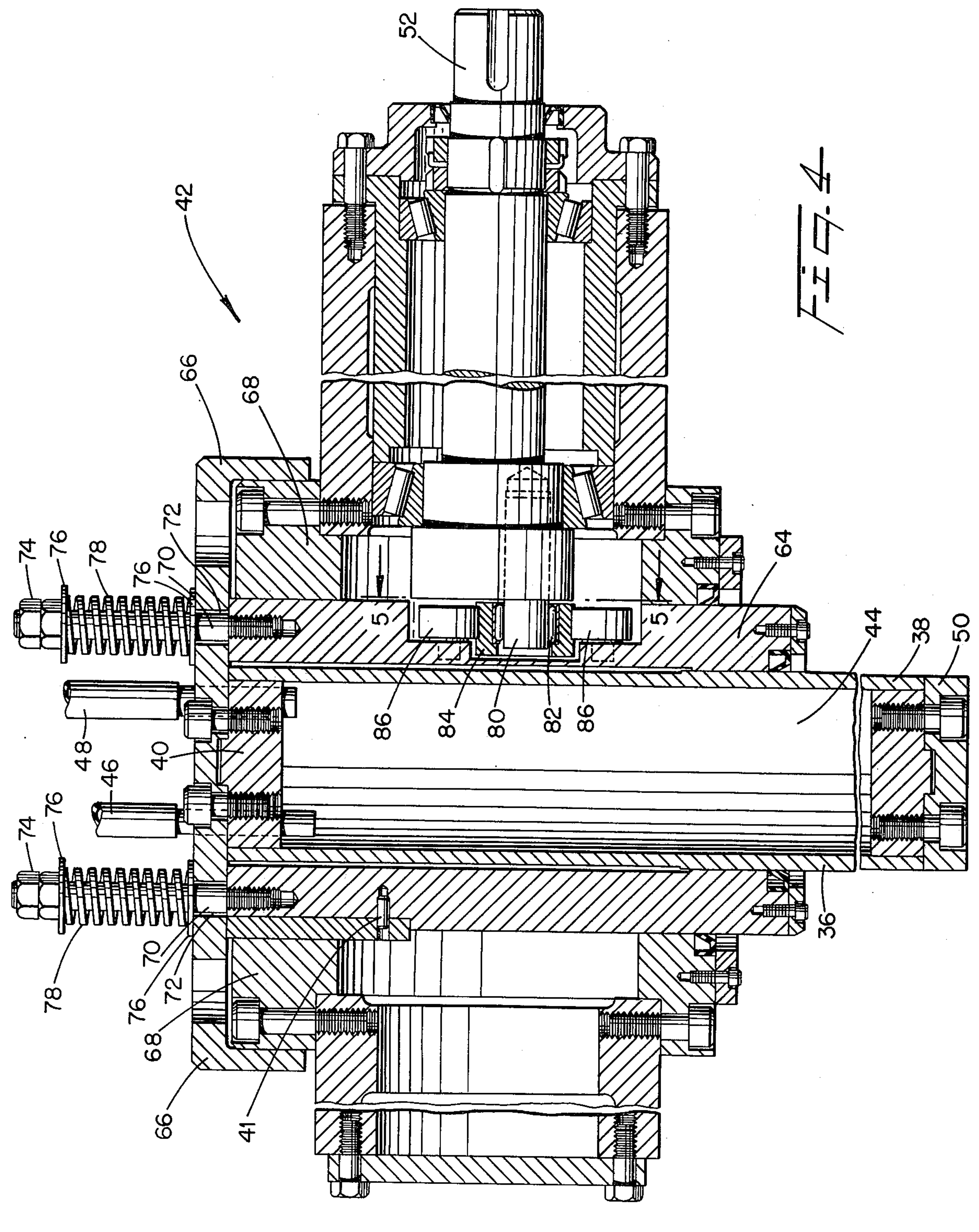
FIG. 4 is a cross-sectional view of another embodiment of the invention.
Figure 5:
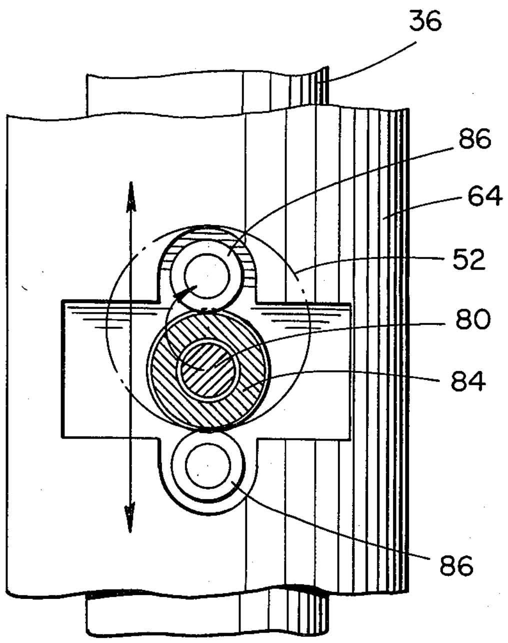
FIG. 5 is a cross-sectional view along line 5—5 of the embodiment depicted in FIG. 4.

In the embodiment depicted in FIGS. 4 and 5, feeder shaft 36 is slidably disposed within sleeve 64. Flange plate 66 is secured to second end 40 of feeder shaft 36. Flange plate 66 is slidably disposed over a raised portion 68 of feeder housing 42 within which sleeve 64 is slidably disposed for axial movement with feeder shaft 36.

Two pins 70 are secured to the top end of sleeve 64 and extend therefrom through openings 72. By means of nuts 74 and washers 76, springs 78 are secured around pins 70 and bias sleeve 64 to flange plate 66.

Crank pin 80 is eccentrically mounted on and extends from the end of drive shaft 52 proximate feeder shaft 36. Rotatably supported through bearings 82 on the end of crank pin 80 is cam 84. Rollers 86 are secured to sleeve 64 on each side of cam 84. As seen in FIG. 5, rotation of drive shaft 52 is translated through crank pin 80, cam 84 and rollers 86 to axial reciprocation of sleeve 64. Because sleeve 64 is biased by springs 78 to flange plate 66 which is secured to feeder shaft 36, in normal operation axial reciprocation of sleeve 64 causes axial reciprocation of feeder shaft 36. Where, however, feeder shaft 36 is prevented from completing a full downward stroke, flange plate 66 slidably translates along pins 70 and compression of springs 78 permits sleeve 64 to complete its normal downward stroke.

In operation, the rate of reciprocation of the feeder shaft 36 may be varied by selection of different speeds of rotation of drive shaft 52. This may be accomplished by varying the rate of rotation of motor 56 through a known control mechanism 57 represented in FIG. 1. The length of stroke of feeder shaft 36 may be varied by changing the location of the crank pin extending from the end of drive shaft 52 to another eccentric position 53 as seen in FIG. 6.

Preferably, the rate of reciprocation of feeder shaft 36 is relatively high and feeds particulate material into the nip of the rolls at a speed substantially equal to the peripheral speed of the rolls. If no slippage occurs, the rate of reciprocation R would preferably satisfy the following relationship:

$$R=(D)(\pi)(r)(2)/d$$

where D is roll diameter, r is rate of rotation of rolls, and d is the diameter of the cross-section of the feeder shaft or ram. Thus, where the rolls have a diameter of 20.5 inches and rotate at 5 RPM, and the feeder shaft diameter is 4.5 inches, the feeder shaft should reciprocate at 143 strokes per minute.

If there is significant slippage between the particulate material and the peripheral surfaces of the rolls, fewer strokes per minute may be desirable. Where additional compression of the particulate material is desired, a higher rate of reciprocation may be preferred.

Depending on the circumstances, it may be desirable to synchronize feeder shaft reciprocation with the appearance of roll cavities at the nip. Thus, for example, rolls with 32 cavities in their periphery rotating at 5 RPM would require a reciprocation rate of the feeder shaft of 160 strokes per minute.

The feeder of the invention may be installed in existing briquetting machines, replacing the screwfeeder. The drive motor for the screw feeder may also be connected to the drive shaft of the instant invention to provide power for feeder shaft reciprocation.

It will be apparent to those skilled in the art that various modifications and variations could be made in the feeder of the invention without departing from the scope or spirit of the invention.

What I claim is:

1. A feeder for a briquetting press in which particulate material is compressed in complementary cavities spaced about the peripheries of a pair of cooperating, rotating rolls, said feeder comprising:

a. a funnel for directing said particulate material toward the nip of said rolls;

b. elongated ram means coaxially disposed in said funnel for compressing said particulate material into the nip of said rolls;

c. drive means for reciprocating said ram means in an axial stroke, the rate of reciprocation and the length of stroke being selectively adjustable; and d. means interconnecting said ram means and said drive means for adjustably controlling the pressure exerted by said ram means on said particulate material.

2. The feeder of claim 1 wherein said drive means rotates about an axis normal to the axis of reciprocation of said ram means.

3. The feeder of claim 1 or 2 wherein said pressure controlling means comprises adjustable spring means for translating movement of said drive means into axial movement of said ram means in a compression stroke.

4. The feeder of claim 3, wherein said ram means comprises a feeder shaft and a flange plate secured to one end of thereof, said spring means comprises a cylindrical sleeve coaxially and slidably disposed around said feeder shaft, one end of said sleeve abutting one side of said flange plate, bolts secured to the one end of said sleeve and slidably projecting through openings in said flange plate, and springs adjustably secured around said bolts and abutting the other side of said flange plate, said springs biasing said sleeve in abutting relationship with said flange plate; and said drive means comprises a power driven shaft and means eccentrically connecting one end of said shaft to said sleeve for translating rotation of said shaft to axial reciprocation of said sleeve.

5. The feeder as in claim 4 also including means for cooling said feeder shaft.

6. The feeder as in claim 5 wherein said feeder shaft has a hollow center enclosed at said one end and the other end thereof, and wherein said cooling means comprises liquid conduit means in fluid communication with the hollow center through the one end for circulating cooling liquid into and out of said hollow center.

7. The feeder as in claim 4 also including a ram plate removably secured to the other end of said feeder shaft.

8. The feeder as in claim 3 wherein said spring means is disposed outside of said funnel.

* * * * *